United States Patent [19]

Jachimowicz et al.

[11] Patent Number: 5,734,154
[45] Date of Patent: Mar. 31, 1998

[54] SMART CARD WITH IINTEGRATED READER AND VISUAL IMAGE DISPLAY

[75] Inventors: Karen E. Jachimowicz, Laveen; Scott R. Novis, Tempe, both of Ariz.

[73] Assignee: Motorola, Inc., Schaumburg, Ill.

[21] Appl. No.: 706,860

[22] Filed: Sep. 3, 1996

[51] Int. Cl.⁶ .................................................. G06K 19/06
[52] U.S. Cl. ........................ 235/492; 235/454; 235/486; 359/630; 345/7
[58] Field of Search ........................ 235/492, 380, 235/435, 454, 486; 359/802, 803, 630; 345/7, 8, 32

[56] References Cited

U.S. PATENT DOCUMENTS

| | | | |
|---|---|---|---|
| 4,672,182 | 6/1987 | Hirokmua | 235/436 |
| 4,774,399 | 9/1988 | Fujita et al. | 235/441 |
| 4,843,223 | 6/1989 | Shino | 235/407 |
| 5,015,830 | 5/1991 | Masuzawa et al. | 235/441 |
| 5,224,198 | 6/1993 | Jachimowicz et al. | 385/133 |
| 5,252,815 | 10/1993 | Pernet | 235/441 |
| 5,272,319 | 12/1993 | Rey | 235/379 |
| 5,325,429 | 6/1994 | Kurgan | 235/441 X |
| 5,410,138 | 4/1995 | Martin | 235/449 |
| 5,461,222 | 10/1995 | Haneda | 275/492 |
| 5,517,011 | 5/1996 | Vandenenger | 235/441 |
| 5,532,466 | 7/1996 | Konno et al. | 235/441 |
| 5,604,640 | 2/1997 | Zipf et al. | 235/380 X |

*Primary Examiner*—Donald T. Hajec
*Assistant Examiner*—Michael G. Lee
*Attorney, Agent, or Firm*—Eugene A. Parsons

[57] ABSTRACT

A smart card (12) including a microchip (14) having information stored thereon, a virtual image display (16) and electronics (22) further connected to the virtual image display (16) for supplying image data thereto. The virtual image display (16) including compact display optics (25) housed within the smart card (12), or having at least a portion thereof positioned in an accessory component (17), for viewing information stored on the smart card (12) at a viewing aperture (18).

20 Claims, 6 Drawing Sheets

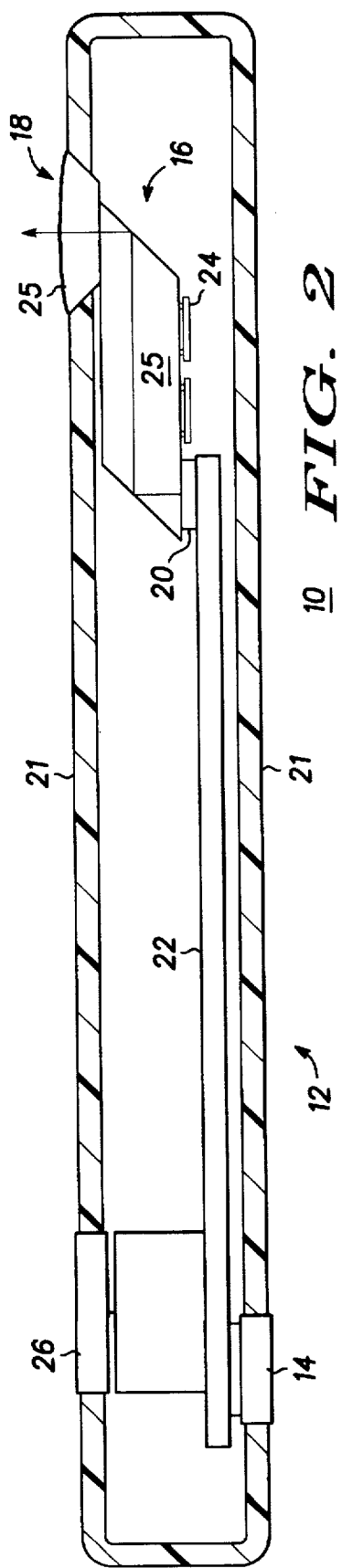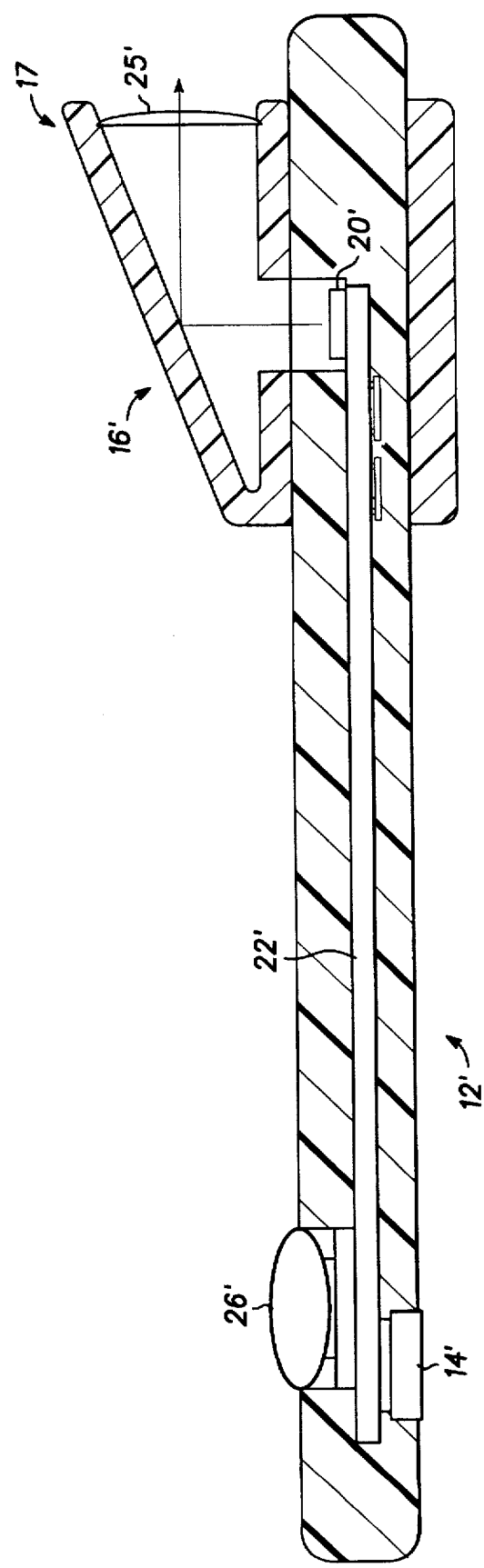

SMART CARD WITH IINTEGRATED READER AND VISUAL IMAGE DISPLAY

FIELD OF THE INVENTION

The present invention pertains to smart cards and an apparatus for reading information contained on a smart card.

BACKGROUND OF THE INVENTION

Smart cards are becoming very popular around the world. Generally a smart card is defined as a card (similar in size to a common credit card) containing a semiconductor chip with some electronics and a memory for storing information. Smart cards are used to store personal information, ranging from medical information to financial data. The large amount of information, or data, stored on a smart card is not generally accessible, even to the owner. Also, various different smart cards are presently in use, including those that operate at a variety of different voltages. It is desirable, therefore, to provide means whereby the owner can view the stored information on the card to determine the status.

It is a purpose of the present invention to provide new and improved display apparatus for viewing information stored on a smart card, the display apparatus being completely housed within, or having portions thereof fabricated as an accessory component.

It is another purpose of the present invention to provide new and improved apparatus for viewing information stored on a smart card, which apparatus, when having portions thereof fabricated as an accessory component, can be standardized to be compatible with virtually any of the multiple types of smart cards.

It is still another purpose of the present invention to provide new and improved apparatus for viewing information stored on a smart card, which apparatus contains safe features to prevent unwarranted viewing of the information.

It is a further purpose of the present invention to provide new and improved apparatus for viewing information stored on a smart card, which apparatus is easy to operate.

SUMMARY OF THE INVENTION

The above problems and others are at least partially solved and the above purposes and others are realized in a smart card including a semiconductor chip, such as a microchip, for storing information on a smart card, electronics, and a visual image display, such as a virtual image display. The visual image display includes an image source positioned in the smart card to provide an image of information contained on the smart card. Display optics are positioned interior the smart card, or having portions thereof fabricated as an accessory component, thus positioned exterior the smart card, for viewing the image of information contained on the smart card at a viewing aperture. The visual image display including a data input terminal designed to receive image data thereon. The electronics are mounted in the smart card and connected to an output terminal of the microchip for receiving the information contained thereon and are further connected to the input terminal of the visual image display for supplying image data thereto in response to the information.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

FIG. 2 is a simplified sectional view as seen along line 2—2 of FIG. 1;

FIG. 4 is a simplified sectional view as seen along line 4—4 of FIG. 3;

DESCRIPTION OF THE PREFERRED EMBODIMENTS

Figure 1:
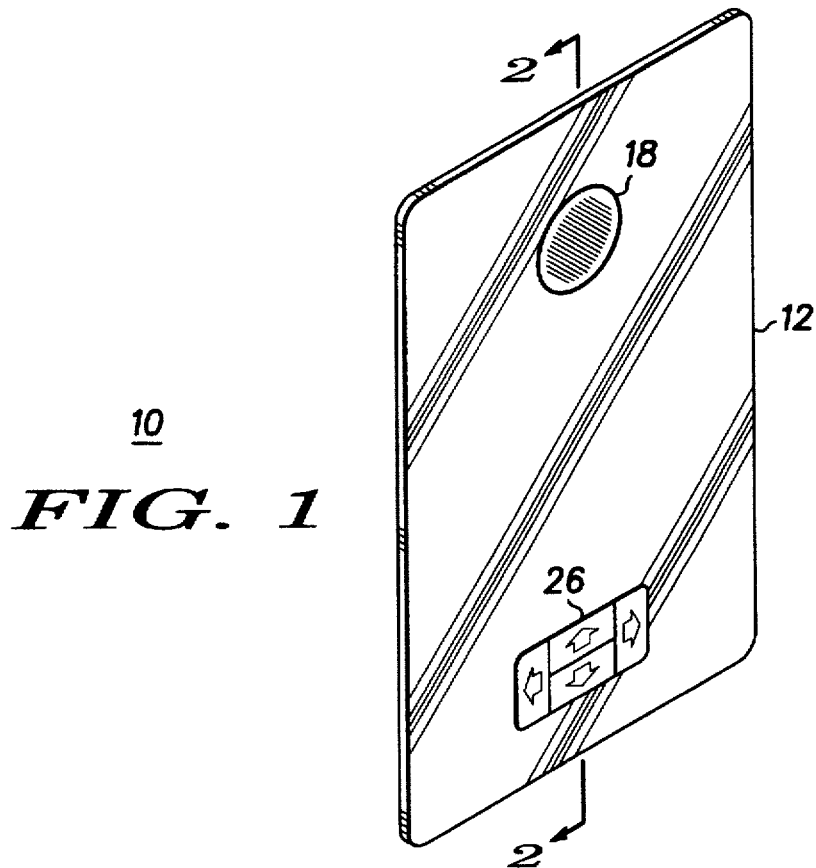
FIG. 1 is an isometric view of a first embodiment of a smart card with reader in accordance with the present invention.

Turning now to the drawings, FIGS. 1 and 2 illustrate a specific embodiment of a smart card with visual image display 10 in accordance with the present invention. Smart card with visual image display 10 includes a smart card 12 having contained therein a semiconductor microchip 14 capable of storing information thereon, a visual image display 16, such as a virtual image display, for providing an image of the information contained on or processed by microchip 14 at an aperture 18, and electronics 22 interfacing with microchip 14 and visual image display 16.

It should be understood that smart card 12 is fabricated so as to be dimensionally thin and portable, thus easily carried by the owner in a wallet, shirt pocket, or the like. In this particular embodiment smart card 12 includes a housing 21 having microchip 14, partially embedded therein. Visual image display 16 is mounted within housing 21 for providing a visual image of the information stored on or processed by microchip 14 at a partially embedded aperture (lens element) 18. Electronics 22 are mounted in housing 21 in electrical communication with a data output terminal of microchip 14 and visual image display 16, which in this specific embodiment are illustrated as being mounted directly on a circuit board containing and interconnecting electronics 22. The circuit board containing electronics 22 is also positioned to have mounted thereon and electrically connected to electronics 22 an image generation apparatus 20 including a two dimensional array of light emitting devices connected to provide a complete image as a part of visual image display 16. Generally, electronics 22 include a central processing unit (CPU) and memory (RAM or ROM) capable of working with the CPU and visual display 16.

In a preferred embodiment, microchip 14 is directly connected to the CPU in electronics 22. The CPU is programmed to interface with the memory and circuitry on microchip 14 and provide the information stored on or processed by microchip 14, thus smart card 12, to visual display 16 in the form of image data. Visual display 16 then generates an image (or images) of the information contained on or processed by microchip 14. Visual image display 16 generally includes image generation apparatus 20, at least one driver circuit 24 (discussed presently) and compact display optics 25 (discussed presently).

It should be understood that in some specific instances a certain amount of communication with the electronics on the smart card may be desired or even necessary and, in these instances, a user interface 26 is constructed to communicate information to microchip 14 from the CPU, as well as communicating information from the microchip 14 to the CPU. User interface 26 is provided to allow the user to communicate with the CPU and, ultimately, microchip 14 and visual image display 16. User interface 26 includes various buttons and controls for operating visual display 16. Generally, user interface 26 includes at least an OFF/ON control and means, such as a cursor for pull-down menus, advance/reverse images, forward and reverse scrolling, etc., to control the views being generated by visual display 16. Associated with user interface 26 is a security circuit which generally will allow operation of smart card with visual image display 10 only in response to some secret information known only to the smart card owner, e.g. a PIN number, biometric input, etc. To this end, user interface 26 may include one or more buttons, a small trackball or pointer device, a miniature joystick, a capacitive thin touch pad, or the like, which must be properly operated by the user to activate smart card with visual image display 10. In addition, display optics 25, when fabricated as a high resolution touch sensitive panel, is capable of not only displaying data but also acting as the biometric input device for more secure applications.

Figure 3:
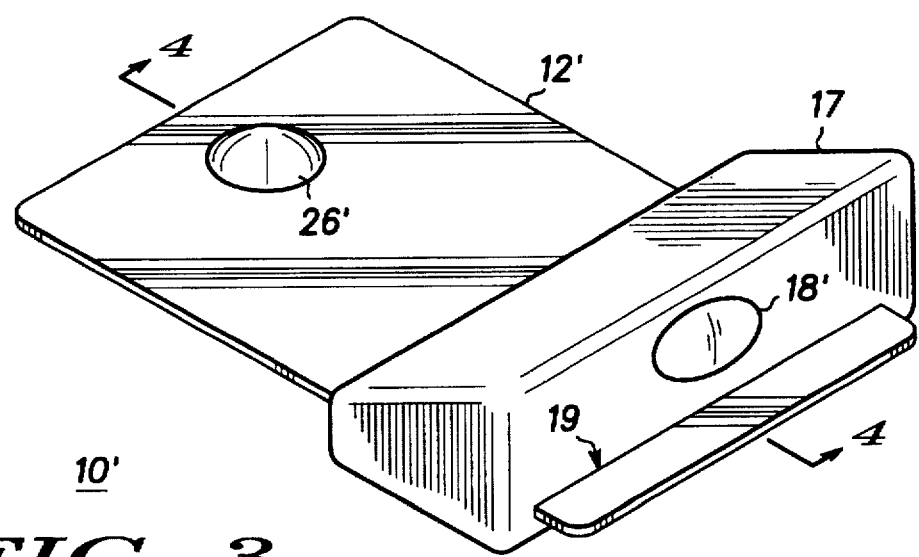
FIG. 3 is an isometric view of a second embodiment of a smart card with externally positioned optics in accordance with the present invention.

Referring now to FIGS. 3 and 4, illustrated is a second embodiment of the smart card with visual image display designated 10' according to the present invention. It should be noted that all components similar to the components illustrated in FIGS. 1 and 2, are designated with similar numbers, having a prime added to indicate the different embodiment. Smart card with visual image display 10' includes an accessory visual display component 17 having a slot 19 formed therein for the insertion of a smart card 12'. Smart card 12' includes a microchip 14' contained therein, or at least partially embedded therein, capable of storing and processing encryption algorithms, such as 128-bit keys for public/private pass key cryptography, and at least a portion of visual image display 16', more specifically an image generation apparatus 20' and a field flattener optical element (discussed presently) for providing an image of the information contained on microchip 14' at an aperture 18'. In addition, included are electronics 22' interfacing with microchip 14' and visual image display 16'.

It should be understood that smart card 12', like the previous disclosed embodiment, would generally be carried by the owner in a wallet, shirt pocket, or the like in addition to accessory component 17. It is anticipated, in that a portion of display optics 25' are positioned in accessory component 17, that smart card 12' would be capable of being fabricated even thinner than when all display components are contained within the smart card itself as previously disclosed in FIGS. 1 and 2. Accessory component 17 is fabricated as a separate device, integral to operation with image generation apparatus 20' contained in smart card 12', thus the reading of information contained on microchip 14'. In this particular embodiment smart card 12' includes microchip 14', partially embedded therein. Visual image display 16' is completely encapsulated by molding smart card 12', more specifically by molding the material comprising smart card 12', about image generation apparatus 20' and any display optics 25' contained therein. Electronics 22' are also encapsulated by material comprising smart card 12' in electrical communication with microchip 14' and visual image display 16', which in this specific embodiment are illustrated as being mounted directly on a circuit board containing and interconnecting electronics 22'. The circuit board containing electronics 22' is also positioned to have mounted thereon and electrically connected to electronics 22' the image generation apparatus 20', similar to image generation apparatus 20 of FIGS. 1 and 2, including a two dimensional array of light emitting devices connected to provide a complete image in accessory component 17. It should be understood that while this particular embodiment describes the molded encapsulation of the various components, it is anticipated that there may be included a housing, similar to that described with regard to FIGS. 1 and 2, or the various components may actually be "sandwiched" between two planar pieces of material comprising smart card 12'. Similarly, smart card 12 of FIGS. 1 and 2 may be a molded encapsulant as described with regard to FIGS. 3 and 4 or similarly "sandwiched" between planar components.

As in the first disclosed embodiment, microchip 14' is directly connected to the CPU in electronics 22'. The CPU is programmed to interface with the memory and circuitry on microchip 14' and provide the information stored on microchip 14', thus smart card 12', to visual display 16' in the form of image data. During operation, the user would insert smart card 12' into slot 19', thereby activating visual display 16' to generate an image (or images) of the information contained on and/or processed by microchip 14'. As described with regard to FIGS. 1 and 2, in some specific instances a certain amount of communication with the electronics on the smart card may be desired or even necessary, accordingly a user interface 26' is constructed to communicate information to microchip 14' from the CPU, as well as communicating information from the microchip 14' to the CPU. User interface 26' operates generally similar to user interface 26 previously described with regard to FIGS. 1 and 2.

Figure 5:
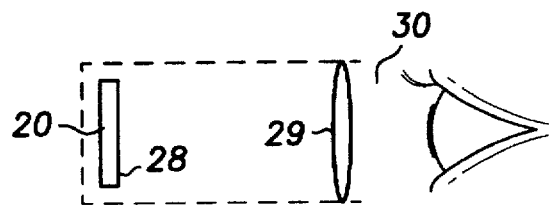
FIG. 5 is a simplified schematic view of a portion of the smart card of FIG. 1.

Referring specifically to FIG. 5, an example of visual display 16 of FIGS. 1 and 2, is illustrated in a simplified schematic view. Display 16 includes image generation apparatus 20 for providing an image on a surface 28. An optical system, represented by lens 29, is positioned in spaced relation to surface 28 of apparatus 20 and produces a virtual image viewable by an eye spaced from an aperture 30 defined by lens 29.

Figure 6:
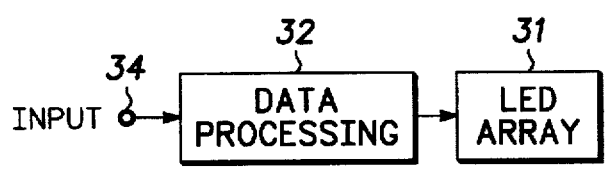
FIG. 6 is a simplified block diagram of a visual display for the smart card with reader of the present invention.

Apparatus 20 is illustrated in more detail in FIG. 6 and includes, for example, semiconductor electronics such as a light emitting device (LED) array 31 driven by data processing circuits 32. Data processing circuits 32 include, for example, logic and switching circuit arrays for controlling each LED in LED array 31. Data processing circuits 32 include, in addition to or instead of the logic and switching arrays, a microprocessor or similar circuitry for processing input signals of software instructions to produce a desired image on a device such as LED array 31. It will be understood that data processing circuits 32 and LED array 31, while illustrated separately for purposes of this description, could be formed on the same semiconductor chip in some applications.

Figure 7:
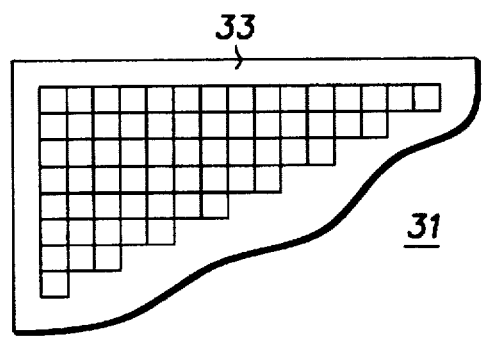
FIG. 7 is a view in top plan of a portion of the apparatus of FIG. 6.

In this specific embodiment LED array 31 includes light emitting diodes which are utilized because of the extremely small size that can be achieved and because of the simplicity of construction and operation. It will of course be understood that other image generating devices may be utilized, including but not limited to lasers (such as vertical cavity surface emitting lasers), liquid crystal devices, organic light emitting diodes, field emission displays, etc. Referring specifically to FIG. 7, a plan view of LED array 31 is illustrated in which the LEDs are formed in a regular pattern of rows and columns on a single substrate 33, which in this embodiment is a semiconductor chip. Portions of substrate 33 are broken away to simplify the drawing but it should be understood that many of the other circuits, and especially drivers, could be included on the same substrate. By addressing specific LEDs by row and column in a well known manner, the specific LEDs are energized to produce an image or images. Digital or analog data is received at an input terminal 34 and converted by data processing circuits 32 into signals capable of energizing selected LEDs to generate the predetermined image.

It will be understood by those skilled in the art that LED array 31 and substrate 33 are greatly enlarged in the figures. The actual size of substrate 33 is on the order of a few milli-meters along each side, with the light emitting area or array being generally in the range of 2 to 50 milli-meters and preferably 5 to 10 milli-meters, with each LED being less than 20 microns on each side and preferably on the order of as little as one micron on a side. It should be understood that the actual light emitting device array is much smaller, because bonding pads, etc. add several milli-meters of area on each side. Generally, the larger size substrates or chips simply mean that more light emitting devices are used in the array to provide more definition, color, etc.

The lens system, represented schematically by lens 29, is mounted in spaced relation from surface 28 of apparatus 20 so as to receive the image from surface 28, magnify it a predetermined amount and create the aperture within which the virtual image is viewed. In the present embodiment, lens 29 magnifies the image fifteen times (15×) so that the image from LED array 31 is magnified fifteen times its original angular size. Generally, a magnification of at least ten is required to magnify the image sufficiently to be perceived by a human eye. It will of course be understood that the lens system may be adjustable for focus and additional magnification, if desired, or may be fixed in housing 21 of FIGS. 1 and 2 for simplicity.

Figure 8:
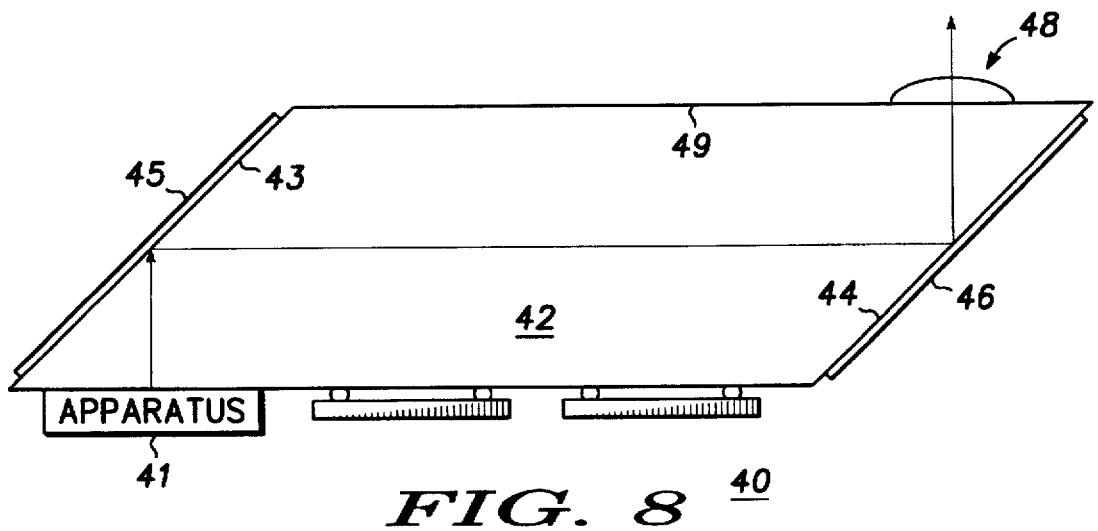
FIG. 8 is a simplified schematic view of a visual display for the smart card with reader of FIG. 1.

Referring now to FIG. 8, illustrated is a visual image display 40, more specifically a miniature waveguide virtual image display, which may be used as visual image display 16 in the first embodiment of the present invention described with regard to FIGS. 1 and 2. Miniature waveguide virtual image display 40 is illustrated in a simplified schematic view. In miniature waveguide virtual image display 40 image generation apparatus 41, similar to image generation apparatus 20 described above, is affixed to the inlet of an optical waveguide 42 for providing a two-dimensional complete image thereto. Light rays from the complete image at image generation apparatus 41 are directed angularly toward a predetermined area on a first side 43 where they are reflected back toward a second side 44 and ultimately toward a third side 49, generally along an optical path defined by sides 43 and 44. Two diffractive, refractive, or reflective optical elements 45 and 46 are affixed to sides 43 and 44, respectively, to which the reflected light rays are directed. Optical elements 45 and 46 provide the required amount of magnification, aberration correction, reflection, and/or filtering so that a virtual image of a desired size is viewable at an aperture 48 defined by the outlet of optical waveguide 42. Visual image display 40 is positioned within the smart card with reader of the present invention, thereby allowing for the viewing of information contained on the microchip embedded within the smart card.

Figure 11:
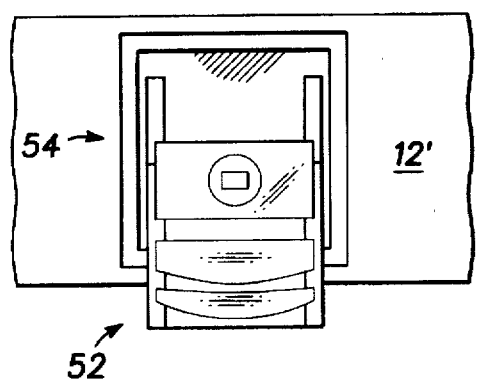
FIGS. 9, 10 and 11 are top front and side views of a portion of the smart card with reader of FIG. 3.
Figure 9:
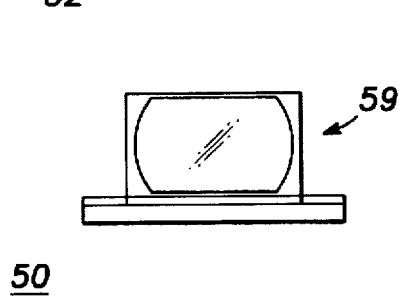
Figure 10:
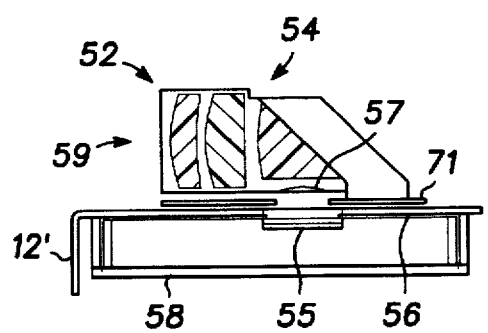

FIGS. 9, 10 and 11 illustrate a top plan view, front view, and side elevation, respectively, of a miniature virtual image display 50 which, in a preferred embodiment, is utilized as visual display 16' in the second embodiment of the smart card with reader of the present invention. Miniature virtual image display 50 incorporates a single fold optical magnifier 52. FIGS. 9, 10 and 11 illustrate miniature virtual image display 50 approximately the actual size to provide some indication as to the extent of the reduction in size achieved by the apparatus. It should be understood that display 50 includes and image generation apparatus 55, generally similar to image generation apparatus 20' of FIGS. 3 and 4, encapsulated by the smart card structure, having the complete optic system or a portion thereof fabricated as an accessory component 54, generally similar to accessory component 17, previously described. More particularly, and as best illustrated in FIG. 10, display 50 includes image generating apparatus 55 mounted within smart card 12'. Image generation apparatus 55 includes an array of light emitting devices, such as organic or inorganic light emitting diodes, field emission devices, vertical cavity surface emitting lasers, liquid crystal devices, etc. In this specific embodiment, image generating apparatus 55 includes an array of light emitting devices, more specifically an array containing 240 columns and 144 rows of light emitting devices. Each light emitting device is fabricated approximately 20 microns on a side with a center-to-center spacing between adjacent devices of no more than 20 microns. Each light emitting device is turned ON with approximately 1.8 volts and utilizes approximately 50 μA of current when it is turned ON. Apparatus 55 produces a luminance less than approximately 15 fL.

Apparatus 55 is mounted on the under-surface of a glass substrate 56 and a driver board 58 is bump-bonded to substrate 56. Additional information on driver boards and bonding of substrates to the driver boards is disclosed in U.S. Pat. No. 5,432,358, entitled "INTEGRATED ELECTRO-OPTICAL PACKAGE", issued Jul. 11, 1995 and assigned to the same assignee, which information is included herein by this reference.

Single fold optical magnifier 52, when fabricated as accessory component 54, includes a plurality of optical elements that when smart card 12' is positioned within a slot, (generally similar to slot 19 of FIGS. 3 and 4) defines a light path from apparatus 55 through an optically clear port 57 in smart card 12', formed substantially coextensive with image generation apparatus 55, to a viewing aperture 59, best seen in FIG. 9. The plurality of optical elements are constructed to angularly magnify images, generated by apparatus 55, at a light inlet of a first optical element by greater than ten. Because of the length of the optical path and the size of apparatus 55 (the image source), the horizontal field of view of the optics ranges from approximately 11 degrees at a magnification of 10× to 22 degrees at a magnification of 20×, with the present embodiment having a horizontal field of view of approximately 16 degrees and a magnification of 15×.

Figure 12:
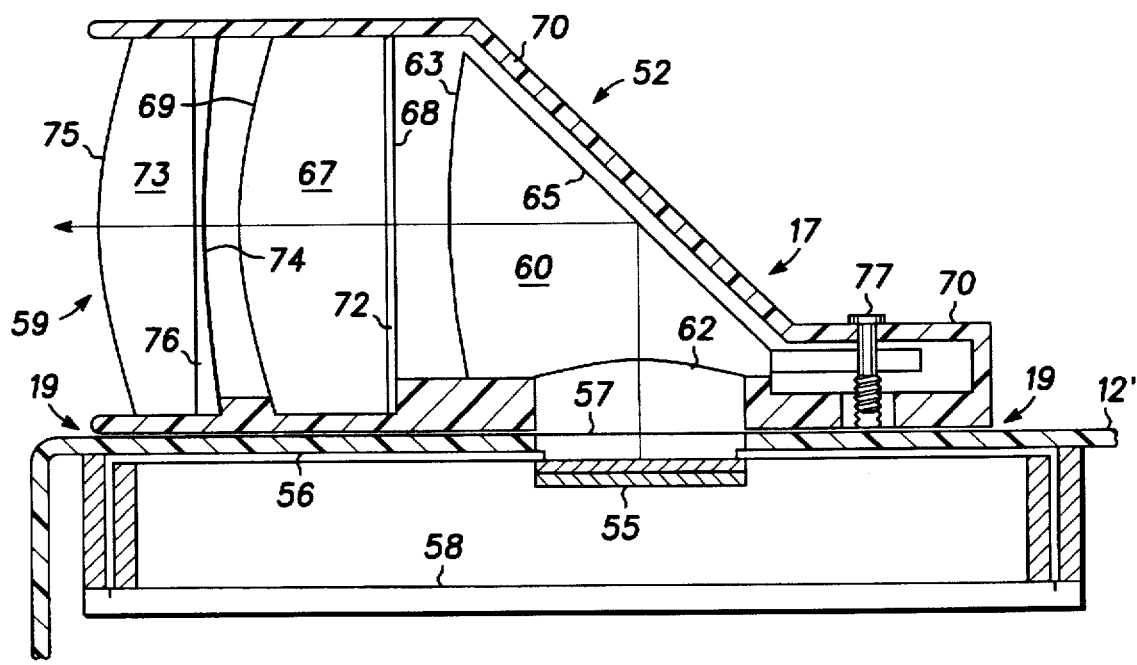
FIG. 12 is an enlarged side view of the apparatus of FIG. 9.

Referring specifically to FIG. 12, a 4× magnified view in side elevation of portions of display 50 of FIGS. 9–11 is illustrated for clarity. From this view it can be seen that the plurality of optical elements includes a first optical element 60 having a field flattening light inlet 62, a spheric surface serving as a light outlet 63 and directed at an angle to field flattening light inlet 62 and a reflecting surface 65 optically positioned between field flattening light inlet 62 and light outlet 63 so as to direct light from field flattening light inlet 62 to light outlet 63. In this specific embodiment, element 60 is formed as a prism and is molded from an optical quality plastic. Generally, it is understood that optical quality plastic is material having a high index of refraction, between approximately 1.5 and 1.6. Reflecting surface 65 may be a separate silvered mirror that is simply molded into first optical element 60, or reflecting surface 65 can be silvered after formation of first optical element 60, or reflecting surface 65 can be uncoated and used in a total internal reflection mode.

In this embodiment, field flattening light inlet 62 takes the form of an aspheric field flattening concave surface molded directly into first optical element 60 and formed as an integral part thereof. It will be understood, however, that field flattening light inlet 62 could be formed as a separate lens and subsequently positioned in optical alignment with the lower surface of first optical element 60. It should also be understood that in an alternative embodiment a portion of the optical system, such as field flattening light inlet 62, may be positioned within and thereby encapsulated by smart card 12'.

Reflecting surface 65 is disposed, with respect to field flattening light inlet 62 and light outlet 63, to fold or bend light passing through first optical element 60 at an angle between approximately 80° to 100°. More specifically, in the embodiment illustrated, light is reflected at an angle of approximately 95°. It has been found, for example, that an angle of 95° avoids vignetting on the lower part of the image at the outlet of single fold optical magnifier 52.

A significant part of the design of miniature virtual image display 50 is the use of a solid, single fold prism with a convex outlet face to enable increased angular magnification (reduced effective focal length) in the same volume of space compared to the use of a simple turning mirror in the air.

The plurality of optical elements further includes an optical lens 67 having a light inlet 68, positioned adjacent light outlet 63 of first optical element 60, and a light outlet 69. In the specific embodiment illustrated, optical lens 67 is a biaspheric optical lens having an aspheric surface defining light inlet 68 and an aspheric surface defining light outlet 69. Optical lens 67 is fixedly mounted relative to first optical element 60 by any convenient means including an outer housing 70, a mounting frame, or any other convenient structure. The aspheric surfaces, including light outlet 69 and light inlet 68 of optical lens 67 and light outlet 63 and field flattening light inlet 62 of first optical element 60 are designed to reduce and/or eliminate any aberration in wavefront as it passes from field flattening light inlet 62 to light outlet 69 of optical lens 67.

The plurality of optical elements, including first optical element 60 and optical lens 67, define a light path from field flattening light inlet 62 of first optical element 60 to light outlet 69 of optical lens 67. To fabricate a single fold optical magnifier that is useful in smart card devices, the total average optical length of the optical path should be in the range of approximately 15 to 35 millimeters. In this embodiment the optical path from field flattening light inlet 62 to the aspheric surface defining light outlet 69 of optical lens 67 is approximately 20 millimeters.

Also, the plurality of optical elements, including first optical element 60 and optical lens 67, are constructed to include at least one diffractive optical element positioned in the light path so as to provide additional, primarily chromatic (in this embodiment), aberration correction. In the embodiment illustrated, a diffractive optical element 72 is incorporated into the aspheric surface defining light inlet 68 of optical lens 67. It will of course be understood that diffractive optical elements can, instead of, or in addition to, diffractive optical element 72, can be included in any other surface of the plurality of elements in miniature virtual image display 50. If a diffractive optical element is included in a surface that is substantially normal to the light path, as opposed to those in which the light strikes the surface at an angle, the diffractive optical element is somewhat easier to construct because of rotational symmetry, whereas surfaces on which light strikes at an angle have nonrotational symmetry. Because the aspheric surfaces and diffractive optical element 72 make optical lens 67 relatively complex, it has been found that fabrication of optical lens 67 is best done by injection molding.

While first optical element 60 and optical lens 67 can be constructed to form a complete magnifier, in this specific embodiment, a low power optical lens 73 is included as an example of possible extensions of the magnifier. Low power optical lens 73 includes a spheric surface which defines a light input 74 and a spheric surface which defines a light output 75. A diffractive optical element 76 is formed in the inlet surface of low power optical lens 73 to provide additional aberration correction. Low power optical lens 73 is mounted adjacent optical lens 67 and forms an outlet optical element that defines the viewing aperture 59 through which the angularly magnified image can be viewed. The addition of low power optical lens 73 may add somewhat to the size and complexity of miniature virtual image display 50, but provides some angular magnification and aberration correction that reduces the complexity of the various other elements, which can in many applications reduce the overall cost of display 50. Because of its low power, low power optical lens 73 may also be used as the package window, or viewing aperture. In applications in which only first optical element 60 and optical lens 67 are utilized, it may be convenient to define the viewing aperture with a glass or plastic window, which may be clear, a light filter, etc.

In many applications it may be desirable to include apparatus for focusing the final image. To this end, first optical element 60 (and other elements 67 and 73, if desired) is mounted to outer housing 70 by means of a threaded adjustment 77 which can be rotated by a thumb screw, screwdriver, etc., to move the fixed assembly of elements 60, 67 and 73 vertically relative to outer housing 70 and apparatus 55. Focusing is accomplished by simply changing the distance between field flattening light inlet 62 and the image generated by apparatus 55.

Figure 13:
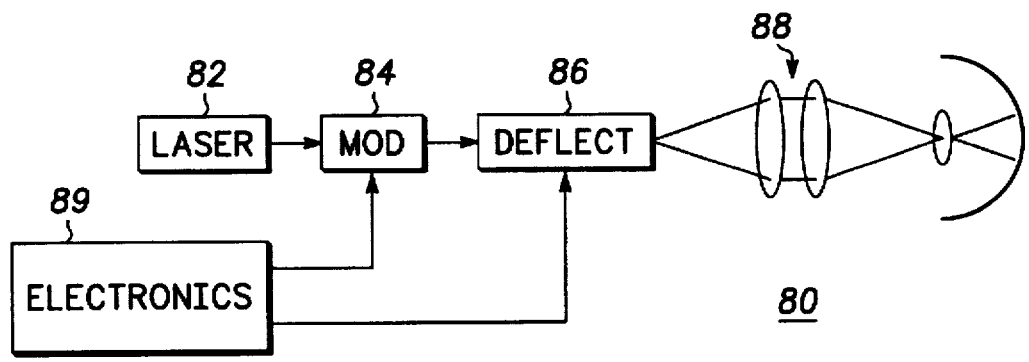
FIG. 13 is a block diagram of another visual display for the smart card with reader of the present invention.

FIG. 13 is a block diagram of a direct retinal scan display 80, which might also be utilized as visual display 16 of FIGS. 1-4. A laser 82, which may be any of the well known lasers including solid state lasers, such as vertical cavity surface emitting lasers, diode lasers, diode-pumped lasers, etc., supplies a coherent light beam to a modulator 84. Modulator 84 impresses video information onto the light beam generally by modulating the intensity of the light beam as, for example, by providing changes in the power level of laser 82. Depending upon the application, the modulation could be as simple as turning laser 82 off and on, which essentially translates into a digital system. Acousto-optic modulators are one of the preferred modulators for most applications, but other techniques, such as electro-optics and mechanical are completely feasible.

The modulated light beam from modulator 84 is directed to a deflection system 86. A lens system 88 is used to focus the light beam from deflection system 86 into an eye. The focal length of lens system 88 is chosen so that the scanning system focal point is within the pupil of the eye and the coherent beam focal point is at the retina of the eye.

Timing and control of modulator 84 and deflection system 86 is provided by electronics 89. Electronics 89 includes a basic oscillator, or timer, which provides the timing signals to cause the sweeping and modulating to occur at the proper times. Also, electronics 89 provides video signals to modulator 84 to modulate the light beam to the correct intensity at the required times. Further, electronics 89 provides horizontal and vertical (orthogonal) deflection signals to cause deflection system 86 to periodically scan the light beam in a raster. Depending upon the application and the desired image resolution, the horizontal deflection frequency may be on the order of 15 to 30 kHz., the vertical deflection is no lower than 60 Hz., and the modulating frequency may be on the order of 12 MHz.

The purpose of deflection system 86 is to scan the modulated light beam on the retina of the eye, or "write" an image on the retina. There are many possible configurations for deflection system 86 and lens system 88, depending upon the application of the display and how it is desired to form the image in the eye. Additional information on this type of display is available in a copending U.S. patent application entitled "DIRECT RETINAL SCAN DISPLAY", Ser. No. 08/292,193, filed Aug. 18, 1994, assigned to the same assignee, which is a file wrapper continuation of U.S. patent application entitled "DIRECT RETINAL SCAN DISPLAY", Ser. No. 07/857,193, filed Mar. 24, 1992. While direct retinal scan display 80 does not technically generate a virtual image, direct retinal scan display 80 is included in the definition of a virtual display apparatus for purposes of this disclosure because of the similarity thereto.

Figure 14:
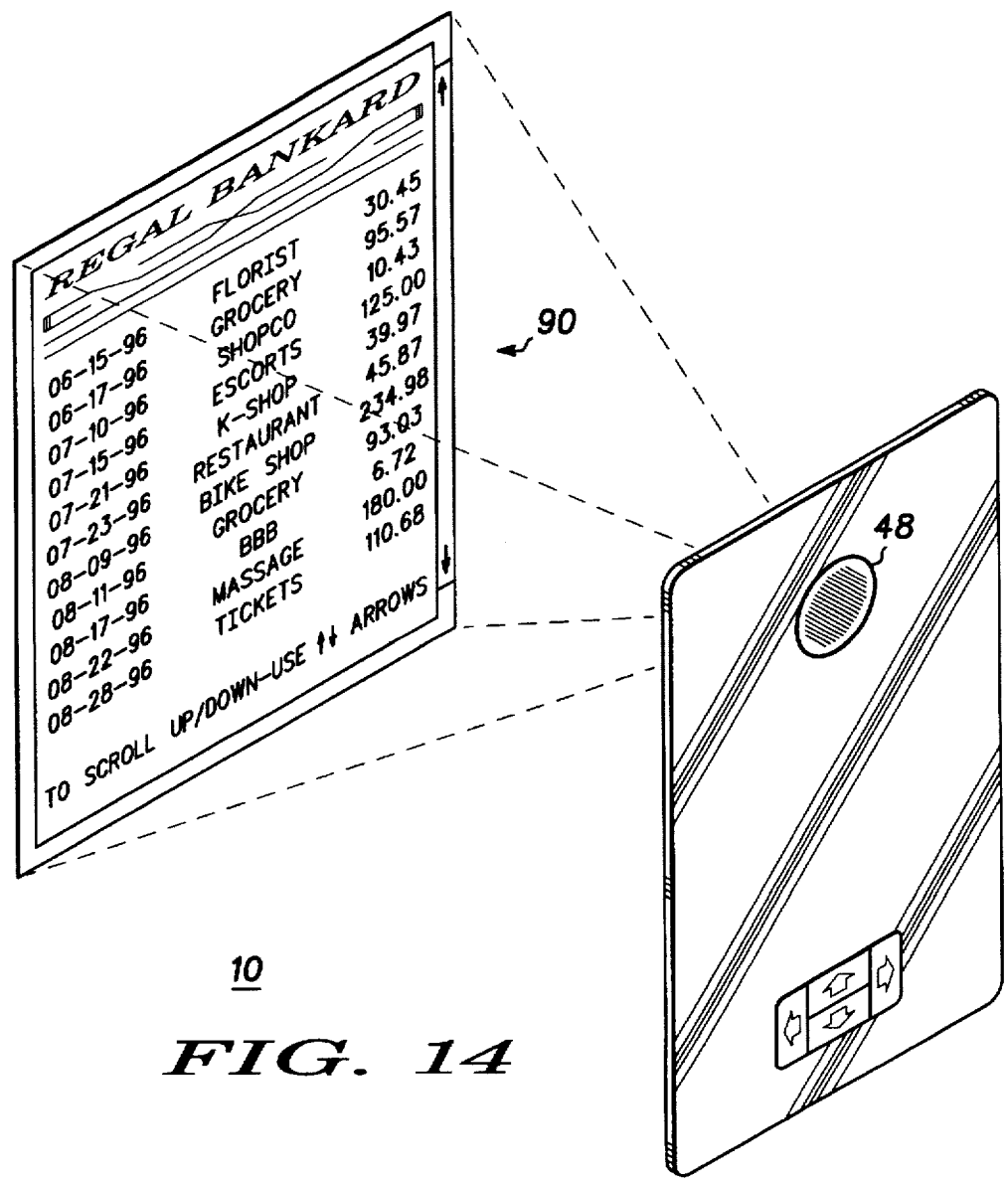
FIG. 14 is an isometric illustrating the operation of the smart card with reader of FIG. 1.

Referring to FIG. 14, a perspective view of smart card with reader 10 is illustrated with miniature virtual image display 40 of FIG. 8 mounted therein so that only viewing aperture 48 is visible. FIG. 14 further illustrates a typical view 90, or virtual image, of transaction information, as well as information stored on smart card 12, more specifically microchip 14, as seen by an operator looking into viewing aperture 48 of smart card with reader 10, which view 90 (virtual image) appears to be behind smart card device 10. View 90 could appear to be as large as an 8.5 by 11 sheet of paper or larger and could include, for example, a complete financial statement of previous account activity, or simply informational data regarding the account, etc.

Figure 15:
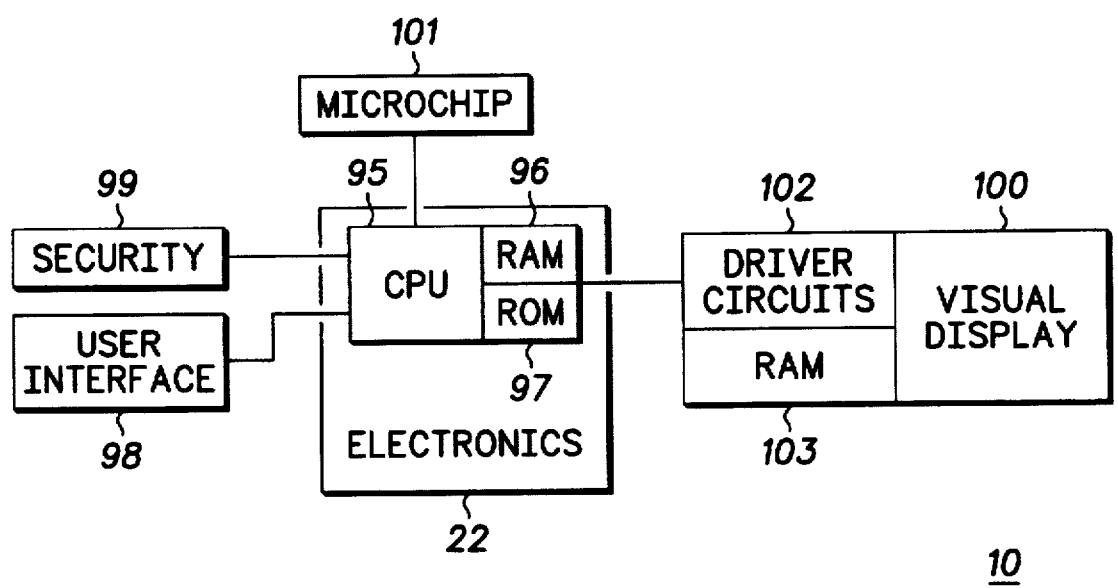
FIG. 15 is a block diagram of the smart card with reader of the present invention.

Turning now to FIG. 15, a simplified block diagram of smart card with reader 10 is illustrated. In this specific embodiment of smart card with reader 10, a central processor unit (CPU) 95 is illustrated as a part of electronics 22, using a random access memory (RAM) 96 and a read only memory (ROM) 97. In this preferred embodiment an MC68HC05SC21 available commercially from MOTOROLA, INC. is utilized as CPU 95. It will of course be understood that RAM 96 and ROM 97 can be internal to CPU 95 and/or external memories can be provided for additional or specialized features. CPU 95 is interfaced with a microchip 101, capable of storing information for smart card 12, generally similar to microchip 14 of FIGS. 1-4

A user interface 98 is provided to allow the user to communicate with CPU 95 and, ultimately, the smart card. User interface 98 includes various buttons and controls for operating a visual display. Generally, user interface 98 includes at least an OFF/ON control and means, such as a cursor for pull-down menus, advance/reverse images, etc., to control the views being generated by visual display 16. Associated with user interface 98 is a security circuit 99 which generally will allow operation of smart card with reader 10 only in response to some secret information known only to the smart card owner, e.g. a PIN number, biometric input, etc. To this end, user interface 98 may include one or more buttons (generally similar to user interface 26 of FIGS. 1-4) which must be properly operated by the user to activate smart card with reader 10.

A visual display 100 includes an array of light emitting devices coupled to driver circuits 102, RAM 103 for storing and/or correctly orienting image data supplied by CPU 95. Generally, visual display 100 can be any of the displays described above. As described above, visual display 100 can include an LCD array such as that described in U.S. Pat. No. 5,486,946, entitled "INTEGRATED ELECTRO-OPTIC PACKAGE FOR REFLECTIVE SPATIAL LIGHT MODULATORS", issued Jan. 23, 1996 and assigned to the same assignee. Also, some typical electronics for generating an image on an array of light emitting devices is described in U.S. Pat. No. 5,432,358, entitled "INTEGRATED ELECTRO-OPTICAL PACKAGE", issued Jul. 11, 1995 and assigned to the same assignee.

Thus, new and improved apparatus for viewing information stored on a smart card is disclosed. The new and improved apparatus is fabricated so as to place the display mechanism within the smart card itself. Advanced image source packaging and compact display optics are incorporated, thereby reducing the volume of the display to a minimum. The smart card when fabricated to house at least a portion of the display optics in an accessory component can be standardized to receive virtually any of the multiple types of smart cards. The smart card further contains safe features to prevent unwarranted viewing of the information. Also, the new and improved apparatus for viewing information stored on a smart card is easy to operate so that each smart card owner can easily obtain instant apprisal of information stored on the smart card.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A smart card having embedded therein and integrated as a part thereof a microchip for storing information on the smart card, electronics for reading the information stored on the smart card and a virtual image display connected to the electronics for providing a virtual image of the information stored on the smart card for viewing at a viewing aperture, the virtual image display including a data input terminal designed to receive image data thereon, an image source and display optics for viewing an image generated by the image source and the display optics being housed within the smart card and optically aligned with the image source and providing an image for viewing at the aperture.

2. A smart card as claimed in claim 1 wherein at least a portion of the display optics are contained within an accessory component capable of optically aligning with the image source housed within the smart card and providing an image for viewing at an aperture.

3. A smart card comprising:
   a microchip embedded within the smart card, having a data input terminal and a data output terminal, and capable of storing dataelectronic information thereon;

a virtual image display embedded within the smart card and positioned to provide an image for viewing at a viewing aperture, the virtual image display including a data input terminal designed to receive image data thereon, an image source and display optics for viewing an image generated by the image source and the display optics being housed within the smart card and optically aligned with the image source and providing an image for viewing at the aperture; and electronics embedded within the smart card and connected to the data output terminal of the microchip for receiving the dataelectronic information contained thereon and further connected to the data input terminal of the virtual image display for supplying image data thereon in response to the dataelectronic information stored thereon the microchip.

4. A smart card as claimed in claim 3 further including at least one user interface control connected to the data input terminal of the microchip.

5. A smart card as claimed in claim 3 wherein the virtual image display includes a two dimensional array of light emitting devices connected to provide a complete image, the two dimensional array being coupled to the data input terminal of the virtual image display for receiving the image data and generating the complete image in response thereto.

6. A smart card as claimed in claim 5 wherein the two dimensional array of light emitting devices includes a two dimensional array of light emitting diodes.

7. A smart card as claimed in claim 6 wherein the two dimensional array of light emitting devices includes a two dimensional array of organic light emitting diodes.

8. A smart card as claimed in claim 5 wherein the two dimensional array of light emitting devices includes a two dimensional array of liquid crystal devices.

9. A smart card as claimed in claim 3 wherein the electronics includes a central processing unit (CPU) and a random access memory (RAM).

10. A smart card as claimed in claim 3 including safety features for preventing unwarranted viewing.

11. A smart card with reader comprising:

a microchip at least partially embedded within the smart card, having a data input terminal and a data output terminal, and capable of storing dataelectronic information thereon;

a virtual image display positioned to provide an image for viewing at a viewing aperture, the virtual image display including a data input terminal designed to receive image data thereon, the virtual image display further including an image source and display optics, the display optics comprised of at least one optical element having a light inlet and a light outlet directed at an angle to the light inlet, with one of a refracting, diffracting and reflecting surface optically positioned between the light inlet and the light outlet so as to direct light from the light inlet to the light outlet, the virtual image display including a two dimensional array of light emitting devices connected to provide a complete image, the two dimensional array being coupled to the data input terminal of the virtual image display for receiving the image data and generating the image in response thereto, and the display optics being housed within the smart card, optically aligned with the image source housed within the smart card and providing an image for viewing at the viewing aperture; and electronics mounted in the smart card and connected to the data output terminal of the microchip for receiving, and processing dataelectronic information, the electronics further connected to the data input terminal of the virtual image display for supplying image data thereto.

12. A smart card with reader as claimed in claim 11 wherein the at least one optical element includes at least one aspheric surface for aberration correction, the at least one optical element defining a light path from the light inlet to the light outlet with a total average optical length in a range of approximately 20 to 35 millimeters, the at least one optical element being constructed to angularly magnify an image generated by the image source at the light inlet by greater than ten.

13. A smart card as claimed in claim 11 wherein at least a portion of the display optics are contained within an accessory component capable of optically aligning with the image source housed within the smart card and providing an image for viewing at an aperture.

14. A smart card according to claim 11 further including at least one user interface control connected to the data input terminal of the microchip.

15. A smart card with reader comprising:

a microchip at least partially embedded within the smart card, having a data input terminal and a data output terminal, and capable of storing dataelectronic information thereon;

a virtual image display positioned to provide an image for viewing at a viewing aperture positioned on an exterior of the smart card, the virtual image display including a data input terminal designed to receive image data thereon, the virtual image display further including a two dimensional array of light emitting devices connected to provide a complete image, the two dimensional array being coupled to the data input terminal of the virtual image display for receiving the image data and generating the image in response thereto, and display optics positioned within the smart card; and electronics mounted in the smart card and connected to the data output terminal of the microchip for receiving and processing the dataelectronic information stored thereon the microchip and further connected to the data input terminal of the virtual image display for supplying image data thereto.

16. A smart card with reader as claimed in claim 15 wherein the two dimensional array of light emitting devices includes a two dimensional array of light emitting diodes.

17. A smart card with reader as claimed in claim 16 wherein the two dimensional array of light emitting devices includes a two dimensional array of organic light emitting diodes.

18. A smart with reader as claimed in claim 15 wherein the two dimensional array of light emitting devices includes a two dimensional array of liquid crystal devices.

19. A smart card with reader as claimed in claim 15 wherein the electronics includes a central processing unit (CPU) and a random access memory (RAM).

20. A smart card with reader as claimed in claim 15 wherein the virtual image display further includes display optics, at least a portion thereof being positioned in an accessory component, the viewing aperture positioned on an exterior of the accessory component.

* * * * *